June 8, 1943.  A. A. SHERER  2,321,528
AUTOMOBILE ACCESSORY
Filed June 26, 1941
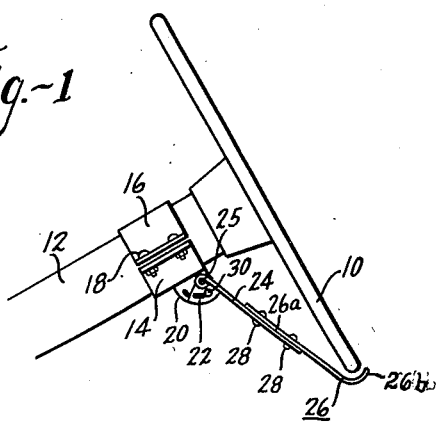
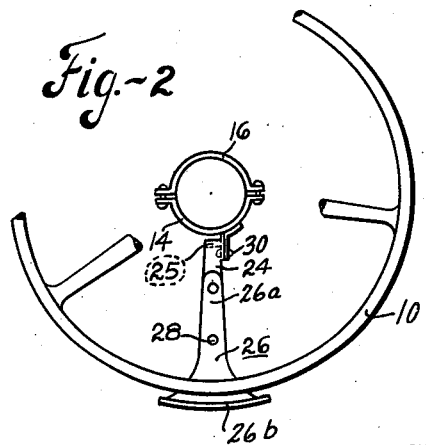
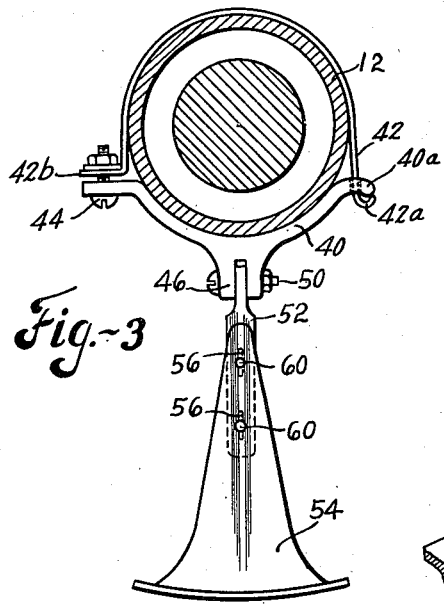
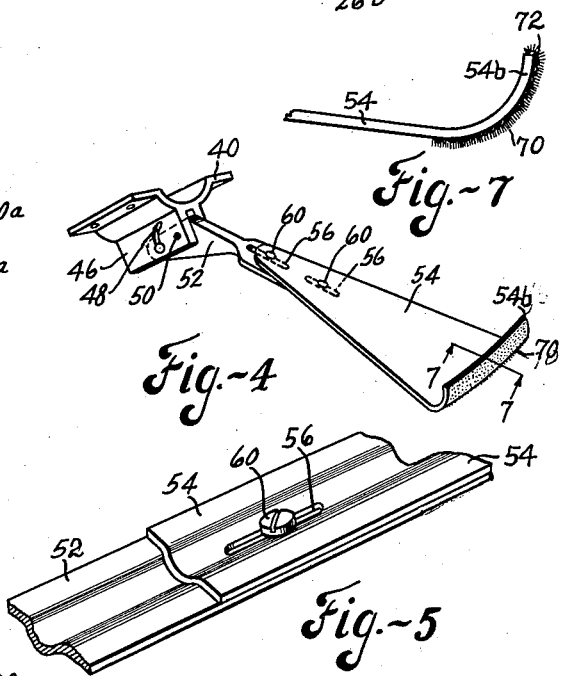
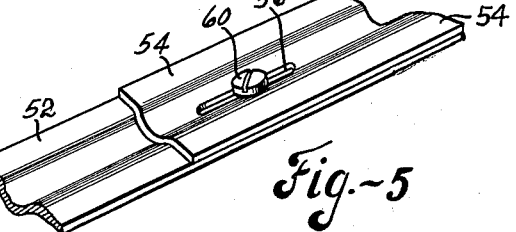
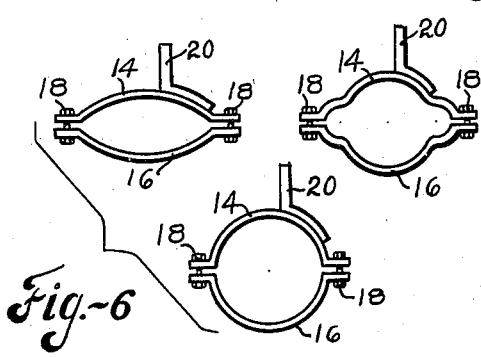
Inventor
Archie A. Sherer
By Henry G. Dybvig
Attorney Patented June 8, 1943

2,321,528

UNITED STATES PATENT OFFICE 2,321,528

AUTOMOBILE ACCESSORY

Archie A. Sherer, Dayton, Ohio

Application June 26, 1941, Serial No. 399,817

7 Claims. (Cl. 74—566)

This invention relates to a motor vehicle accessory and more particularly to an accessory for protecting the wearing apparel of the driver from rapid wear caused by the steering wheel.

In driving motor vehicles such as automobiles, trucks and the like, there is a marked tendency for the steering wheel to wear the clothing. Especially is this the case when the driver is large and the space is limited. Drivers have found that the steering wheel has a tendency to fray and wear the edges of overcoats, topcoats and other outer garements when the garments are permitted to rub against the steering wheel.

An object of this invention is to provide a shield interposed between the driver's clothing and the nearest portion of the rim of the steering wheel, so as to keep the clothing out of contact with the wheel itself.

Another object of this invention is to provide a stationary shield holding the clothing of the operator away from the steering wheel.

Another object of this invention is to provide a shield that is easily installed, economically produced and adjustably mounted, so as to accommodate various makes of cars without any alterations thereof.

Another object of this invention is to provide a shield covered at least in part by a fabric material which may or may not match the upholstering material used in the motor vehicle.

Other objects and advantages reside in the construction of parts, the combination thereof, and the mode of operation, which will become more apparent from the following description.

The accessory for motor vehicles disclosed herein is adapted to be adjustably attached to the steering column of a motor vehicle and includes an arcuate shield mounted in proximity to the portion of the steering wheel nearest the driver, so as to protect the clothing of the driver from contacting the steering wheel.

An adapter selected from a plurality of adapters is used for attaching the shield to the steering column. If, for example, the shield is to be attached to a Buick, an adapter designed for use with the steering column of a particular model of Buick is selected for attaching the shield to the steering column. In the event the shield is to be used in association with some other make of automobile, as for example, a Ford, an adapter designed for use with Fords is selected, et cetera.

When the adapter has been attached to the steering column, the shield is adjusted so as to be properly spaced with respect to the steering wheel, which adjustment controls the angular position of the shield and the distance from the shield to the steering column, as will appear more fully from the detailed description that follows.

In the drawing,

Figure 1 is a side elevational view of a shield and its support adapted to protect the clothing of the driver from contacting the rim of the steering wheel.

Figure 2 is a top plan view of the modification disclosed in Figure 1, showing the steering wheel broken away in part and the steering column removed in its entirety.

Figure 3 discloses another modification showing another type of support, wherein another type of adapter has been shown.

Figure 4 is another modification of the shield and a portion of the bracket.

Figure 5 is an enlarged fragmentary detail view showing the adjustability of the shield relative to the steering wheel.

Figure 6 discloses a plurality of adapters for use with different makes and styles of motor vehicles.

Figure 7 is an enlarged detail, fragmentary, cross sectional view disclosing the napped surface on the face of the shield.

Referring to the drawing, the reference character 10 is used to designate any conventional steering wheel for use in automobiles, trucks, tanks, farm implements and the like. The steering wheel 10, as is well known to those skilled in the art, is mounted upon a steering column 12. The steering wheel 10 and the steering column 12 may be of any desirable design and may vary greatly in shape and size.

The shield assembly includes a split collar consisting of members 14 and 16, encircling the steering column 12 and held in position by a plurality of screws or bolts 18. Member 14 supports a bracket 20 provided with an arcuate slot 22 and pivotally supporting an arm or brace 24 having attached thereto a shield portion 26 by a plurality of rivets 28, or other suitable fastening devices, such as screws, welding et cetera. The shield portion includes the stem or shank 26a flaring outwardly and terminating in an arcuate portion 26b arranged in close proximity to the portion of the steering wheel closest to the driver. The shield portion 26b protects the clothing from contacting the rim of the wheel 10. Many drivers find that the steering wheel, without the shield 26b, wears the clothing contacting the wheel, so as to fray the edges of the coats or outer garments contacting the wheel. The shield assembly greatly reduces the wear on the clothing. The surface of the shield is preferably coated or plated, so that the finish harmonizes with the interior finish of the motor vehicle.

In the preferred embodiment disclosed in Figures 1 and 2, the height of the shield 26b may be adjusted by causing the pivoted brace 24 to be oscillated about a pivot 25. After the shield has been adjusted, it is held in adjusted position by a suitable screw 30.

The particular bracket or adapter encircling the steering column is selected from a plurality of brackets of various sizes and dimensions, as illustrated in Figure 6. The bracket is selected so as to fit the particular steering column with which the shield is to be associated. When the shield assembly is mounted upon another make or type of steering column, another bracket or adapter is selected.

The modification disclosed in Figures 3 and 4 shows another type of bracket 40 held in position with a strap 42, having one end 42a arranged in hooked relation with one end 40a of the bracket and the other end 42b held in position by screws 44. This adapter may be used with various diameters and a number of shapes of steering columns by merely selecting the proper strap 42. The bracket 40 terminates in a bifurcated clevis-like portion 46, provided with an arcuate slot 48 and a suitable aperture 50, so as to hold in adjusted position a brace 52, adjustably supporting a shield 54. The shield 54 is preferably provided with longitudinal slots 56 receiving bolts or screws 60, holding the shield 54 in any radially adjusted position.

As may best be seen by referring to Figure 5, both the brace 52 and the shank of the shield 54 are ribbed, so as to give the parts rigidity. If, for example, a steering wheel having a 15″ diameter is used, the shield is adjusted radially with respect to the brace 52, so as to accommodate a wheel having this diameter. If a larger or smaller diameter wheel is used, the shield is adjusted to accommodate the difference in diameter. Likewise, in the event it is found necessary to raise or lower the shield on the steering column, so as to accommodate various mechanisms that may be mounted on the steering column, as for example the gear shifting device, the angular position of the shield may be adjusted accordingly by utilizing the arcuate slot 48 and the screw associated therewith. By this arrangement, the shield assembly may be used with a great number of types and sizes of steering columns and steering wheels.

As may best be seen by referring to the cross sectional view shown in Figure 7, taken substantially on the line 7—7 of Figure 4, it can readily be seen that the shield portion 54b is covered with a napped surface 70, wherein the nap is held in position either by a suitable cement or united to a piece of fabric 72 cemented to the exposed surface of the shield. This permits a finish on the exposed portion of the shield like the upholstering used in the motor vehicle. Any other suitable type of finish may be used to enhance the appearance of the accessory.

Brackets encircling the steering column may be eliminated by merely welding the shank of the shield to the steering column in the proper position. By this arrangement, the shield assembly may constitute a single stamping that may have a fan-shaped appearance.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An accessory for a motor vehicle having a steering wheel, said accessory including a shield having a portion radially disposed beyond the rim of the steering wheel so as to shield a portion of the steering wheel, said shield being interposed between the trunk of the driver's body and the nearest portion of the steering wheel to hold the driver's clothing out of contact with the steering wheel, and adjustable means for attaching the shield to the steering column, said means including a shank portion integral with the edge of the shield.

2. An accessory for a motor vehicle having a steering wheel, said accessory including a shield having a portion radially disposed beyond the rim of the steering wheel so as to shield a portion of the steering wheel, said shield being interposed between the trunk of the driver's body and the nearest portion of the steering wheel to hold the driver's clothing out of contact with the steering wheel, said shield being provided with an integral shank portion adapted to support the shield so that the shield presents a uniform surface exposed to the driver's clothing, and means engaging the shank portion of the shield, said means being secured to the steering column supporting the steering wheel.

3. An accessory for a motor vehicle having a steering wheel, said accessory including a shield having a portion radially disposed beyond the rim of the steering wheel so as to shield a portion of the steering wheel, said shield being interposed between the trunk of the driver's body and the nearest portion of the steering wheel to hold the driver's clothing out of contact with the steering wheel, said shield having an integral shank portion adapted to support the shield so that the shield presents a uniform surface exposed to the driver's clothing, and an adapter selected from a plurality of adapters, said adapter being mounted upon the steering column and engaging the shank of the shield so as to hold the shield in position.

4. An accessory for a motor vehicle having a steering wheel, said accessory including a shield interposed between the trunk of the driver's body and the nearest portion of the steering wheel to hold the driver's clothing out of contact with the steering wheel, said shield having an arcuate portion having a curvature corresponding to the curvature of the margin of the steering wheel, and an adapter selected from a plurality of adapters, said adapter being mounted upon the steering column, and means for adjustably attaching the shield to the adapter.

5. An accessory for a motor vehicle having a steering wheel, said accessory including a shield having a portion radially disposed beyond the rim of the steering wheel so as to shield a portion of the steering wheel, said shield being interposed between the trunk of the driver's body and the nearest portion of the steering wheel to hold the driver's clothing out of contact with the steering wheel, said shield having an arcuate portion having a curvature corresponding to the curvature of the adjacent portion of the steering wheel, napped means for covering the shield, and means for attaching the shield to the steering column so as to hold the shield in position.

6. An accessory for a motor vehicle having a steering wheel, said accessory including a shield interposed between the trunk of the driver's body and the nearest portion of the steering wheel to hold the driver's clothing out of contact with the steering wheel, an adapter selected from a plurality of adapters, said adapter being secured to the steering column, and adjustably mounted means pivotally attached to said adapter, said adjustably mounted means supporting the shield in adjusted position with respect to the steering wheel.

7. An accessory for a motor vehicle having a steering wheel, said accessory including a shield interposed between the trunk of the driver's body and the nearest portion of the steering wheel to hold the driver's clothing out of contact with the steering wheel, said shield including a shank portion provided with a longitudinal rib, an adapter mounted upon the steering column, said adapter including ribbed means registering with the rib of the shank portion, and means for securing the shank portion to said ribbed means.

ARCHIE A. SHERER.